(12) United States Patent
Yoshizawa et al.

(10) Patent No.: US 8,817,027 B2
(45) Date of Patent: Aug. 26, 2014

(54) GRAPH DISPLAY APPARATUS, RECORDING MEDIUM ON WHICH PROGRAM IS RECORDED AND GRAPH DISPLAY METHOD

(75) Inventors: Hiroaki Yoshizawa, Ome (JP); Kensuke Toba, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 795 days.

(21) Appl. No.: 13/038,552

(22) Filed: Mar. 2, 2011

(65) Prior Publication Data

US 2011/0227946 A1    Sep. 22, 2011

(30) Foreign Application Priority Data

Mar. 19, 2010    (JP) ................................ 2010-063527

(51) Int. Cl.
   *G06T 11/20*    (2006.01)
   *G09G 5/00*    (2006.01)
   *G06F 15/02*    (2006.01)

(52) U.S. Cl.
   CPC ...................................... *G06F 15/02* (2013.01)
   USPC ............ 345/440; 345/442; 345/443; 345/636

(58) Field of Classification Search
   CPC ..... G06T 11/20; G06T 11/203; G06T 11/206; G06F 15/02
   USPC ................................................. 345/440–443
   See application file for complete search history.

(56) References Cited

U.S. PATENT DOCUMENTS

| | | | |
|---|---|---|---|
| 2003/0193502 A1* | 10/2003 | Patel et al. | 345/440 |
| 2004/0243374 A1* | 12/2004 | Kundert | 703/14 |
| 2005/0162423 A1* | 7/2005 | Goggin | 345/440 |
| 2009/0307587 A1* | 12/2009 | Kaneko | 715/700 |

FOREIGN PATENT DOCUMENTS

| | | |
|---|---|---|
| JP | 62-65080 A | 3/1987 |
| JP | 9-282476 A | 10/1997 |
| JP | 11-282931 A | 10/1999 |

OTHER PUBLICATIONS

Japanese Office Action dated Jul. 19, 2011 (and English translation thereof) in counterpart Japanese Application No. 2010-063527.
Chinese Office Action dated Apr. 3, 2013 (and English translation thereof) in counterpart Chinese Application No. 201110069185.8.

* cited by examiner

*Primary Examiner* — Tize Ma
(74) *Attorney, Agent, or Firm* — Holtz Holtz Goodman & Chick PC (57) ABSTRACT

A graph display apparatus including: a display unit; a graph formula input unit for receiving input of a graph formula; a coordinate system setting unit for setting a display range of a coordinate system and a scale interval on a coordinate axis in the coordinate system; a coordinate system display controlling unit for making the display unit display the coordinate axis, and display scales and scale values at the scale interval, the coordinate system display controlling unit including a scale value display controlling unit for detecting overlapping of the scale values to be displayed, and, when the scale values overlap, making the display unit display only scale values of scales at both ends among the scales to be displayed on the coordinate axis; and a graph display controlling unit for making the display unit display a graph of the graph formula.

6 Claims, 9 Drawing Sheets

GRAPH DISPLAY APPARATUS, RECORDING MEDIUM ON WHICH PROGRAM IS RECORDED AND GRAPH DISPLAY METHOD

BACKGROUND OF THE INVENTION

1. Field of the Invention

The present invention relates to a graph display apparatus, a recording medium on which a program is recorded and a graph display method which can display a graph in which scale intervals are set for each coordinate axis.

2. Description of the Related Art

Conventionally, a graph display apparatus which displays a graph of a function formula is configured to display a numerical value (scale value) in each scale position when a user sets scale intervals on coordinate axes.

Therefore, when a user sets an X-axis scale interval to "100" in order to check Y values corresponding to X values "100", "200" . . . , for example, in the graph, the scales and the scale values in the positions of each scale are displayed in the positions of X values "100", "200" . . . , on the X axis.

Incidentally, when display contents are zoomed out to see the overview of a graph (X-Y display range, i.e., Xmin, Xmax, Ymin, and Ymax are expanded to zoom out), a great number of scales are to be displayed in the display screen, and therefore the scales look too cramped even if the scale values of each scale are displayed with the size of the characters simply being reduced. Further, this problem occurs likewise when scale intervals are originally set small.

Therefore, recent graph display apparatuses are configured to automatically reduce the number of scales and to display scale values in the positions of the remaining scales when display contents are zoomed out, for example.

However, when the number of scales is automatically reduced, scale intervals set by a user change and thereby the displayed scales become confusing and cause misunderstanding. Further, it may be possible not to display scale values, from the viewpoint of preventing displayed scale values from being cramped. In this case, however, the range to be displayed of the graph becomes difficult to understand.

SUMMARY OF THE INVENTION

It is therefore an object of the present invention to display a range to be displayed of a graph while preventing the graph from looking cramped, and preventing scale intervals from being changed.

To achieve the abovementioned object, there is provided a graph display apparatus including: a display unit; a graph formula input unit for receiving input of a graph formula based on a user operation; a coordinate system setting unit for setting a display range of a coordinate system and a scale interval on a coordinate axis in the coordinate system based on the user operation; a coordinate system display controlling unit for making the display unit display the coordinate axis in the coordinate system in the display range set by the coordinate system setting unit and display scales and scale values at the scale interval set by the coordinate system setting unit on the coordinate axis, the coordinate system display controlling unit including a scale value display controlling unit for detecting overlapping of the scale values to be displayed on the coordinate axis, and, when the scale values overlap, making the display unit display only scale values of scales at both ends among the scales to be displayed on the coordinate axis; and a graph display controlling unit for making the display unit display a graph of the graph formula in the set display range of the coordinate system.

According to the present invention, a display range of a coordinate system and scale intervals on coordinate axes in the coordinate system are set based on a user operation, overlapping of scale values to be displayed on the coordinate axes is detected, and, when the scale values overlap, only the scale values of the scales at both ends among the scales to be displayed on the coordinate axes are displayed. Therefore, it is possible to display a range to be displayed of a graph while preventing the graph from looking cramped, and preventing scale intervals from being changed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

One of embodiments according to the present invention will be described in detail below with reference to the accompanying drawings. However, the scope of the invention is not limited to the illustrated embodiment.

1.1 Appearance Configuration

Figure 1:
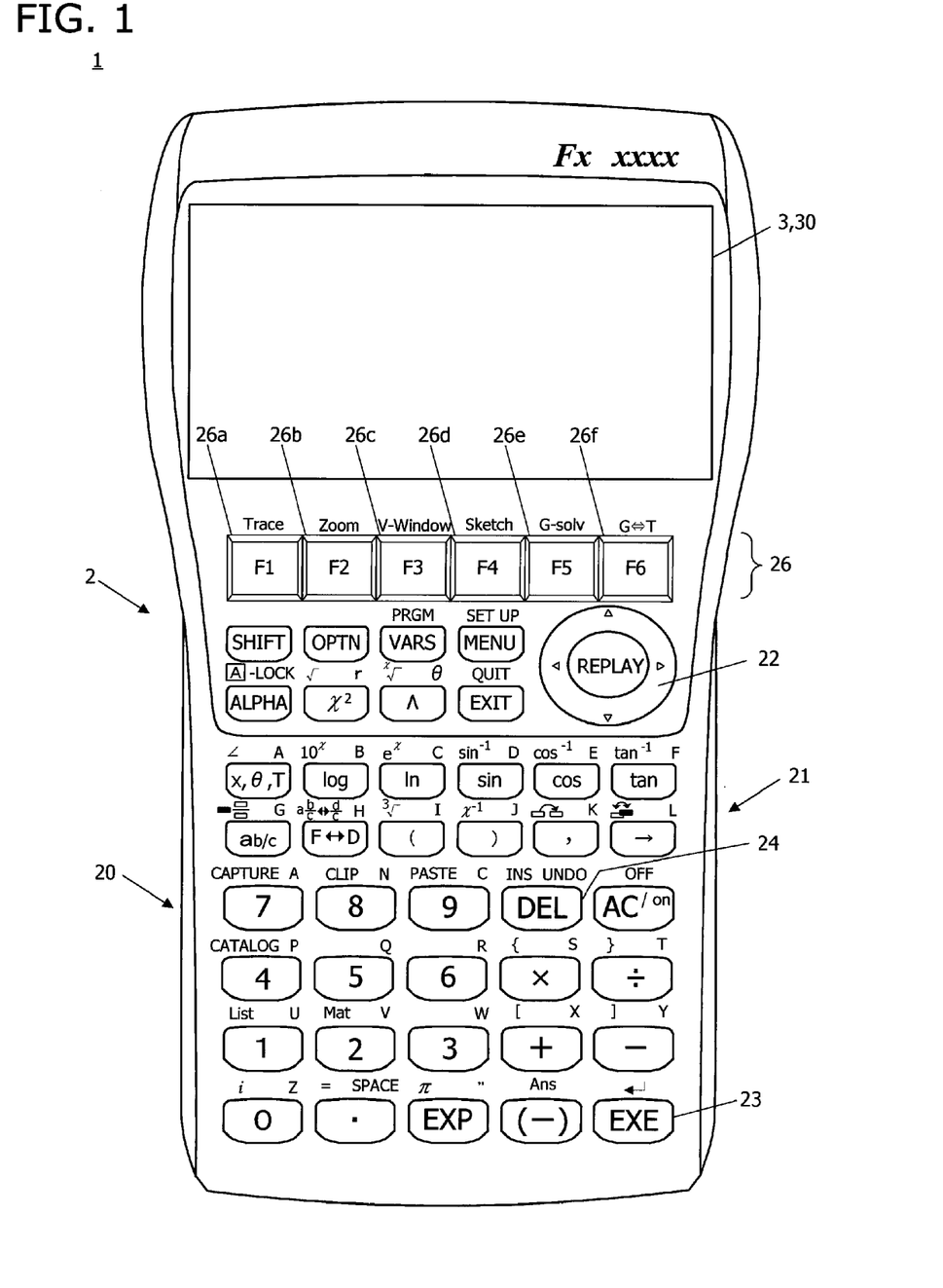
FIG. 1 is a plan view illustrating a schematic configuration of a scientific electronic calculator.

FIG. 1 is a plan view illustrating a schematic configuration of a scientific electronic calculator 1 to which an electronic device according to the present invention is applied. As illustrated in FIG. 1, the scientific electronic calculator 1 has an input key group 2 having various key groups and a display 3.

The input key group 2 receives an operation of inputting a mathematical formula element such as a numerical value or an arithmetic operation symbol from a user and receives operations of commanding various pieces of processing, and has a plurality of keys to which unique functions are respectively assigned. In the present embodiment, the input key group 2 has, for example, a numerical keypad 20, arithmetic operation symbol keys 21, a cursor key 22, an EXE key 23, a delete key 24 and function keys 26.

Among these keys, the numerical keypad 20 includes keys for receiving operations of inputting numerical values, and the arithmetic operation symbol keys 21 receive operations of inputting various arithmetic operation symbols such as a symbol or a bracket of four arithmetic operations, a vinculum of a fraction, a root sign ($\sqrt{\ }$), a logarithmic symbol, a constant (for example, the circumference ratio "$\pi$" or the light velocity "c") and a trigonometric function symbol.

The cursor key 22 is pushed down to move a cursor, which indicates a position to be edited or a position to be selected, in a predetermined direction in the display 3, for example. The cursor key 22 is configured to receive inputs in four directions of up, down, left and right in the present embodiment.

The EXE key 23 receives an operation of inputting an execution command or a determination command of processing, and functions as a key for commanding an execution of arithmetic processing after a mathematical formula is input, for example. The delete key 24 receives an operation of deleting a numerical value or an arithmetic operation symbol displayed on the display 3.

The function keys 26 include a plurality of keys for receiving an execution command of predetermined processing, and, in the present embodiment, include six keys 26a to 26f of "F1" to "F6". Among these keys, the "F2" key 26b is operated when a display range in the display 3 is to be changed. Further, the "F3" key 26c is operated to set or see view window information. The view window information shows a display mode of the X-Y coordinate system, and, in the present embodiment, shows a display range (maximum and minimum coordinate values of X and Y; that is, Xmin, Xmax, Ymin, and Ymax) of the X-Y coordinate system, scale intervals (Xscl and Yscl) on each coordinate axis, and a dot interval (X dot) in the X-axis direction when a graph is displayed. When a graph is displayed, Y values of a graph equation are computed based on the X coordinate values which start from the X minimum coordinate value, the Y values being computed at the dot interval, and are plotted in the positions of the corresponding coordinates in the display range to display a graph.

The display 3 is composed of, for example, an LCD (Liquid Crystal Display) or an ELD (Electronic Luminescent Display). The display 3 displays various pieces of data required for the use of the scientific electronic calculator 1 as well as texts, signs, mathematical formulae or arithmetic operation results, or the like, according to the operation of the input key group 2 or the like. In addition, on the display 3 according to the present embodiment, a touch panel 30 is provided over the entire display screen, the touch panel 30 being integrated with the display 3.

1.2 Function Configuration

Next, the function configuration of the scientific electronic calculator 1 will be described.

Figure 2:
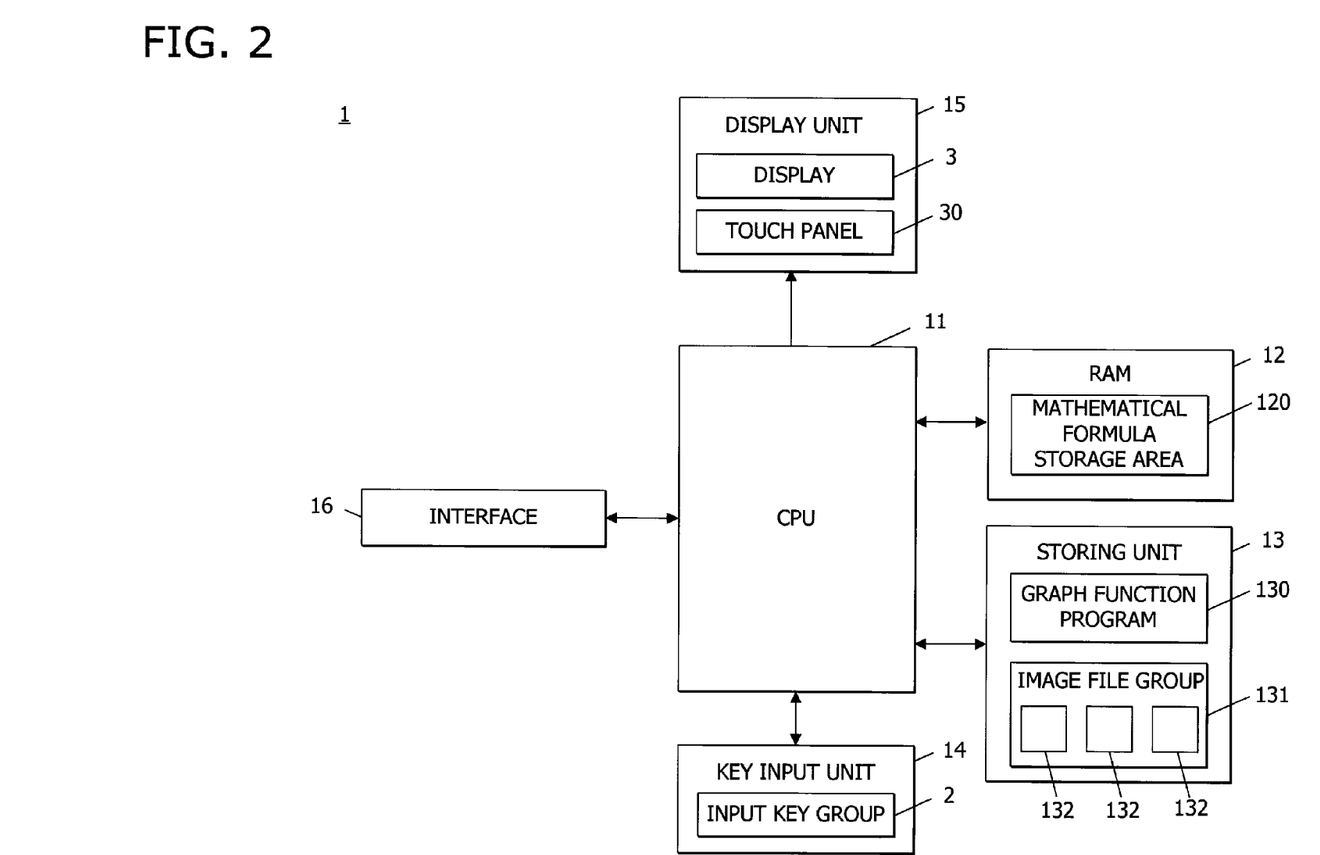
FIG. 2 is a block diagram illustrating a function configuration of the scientific electronic calculator.

FIG. 2 is a block diagram illustrating a schematic function configuration of the scientific electronic calculator 1.

As illustrated in FIG. 2, the scientific electronic calculator 1 is composed of a key input unit 14, a display unit 15, an interface 16, a RAM (Random Access Memory) 12, a storing unit 13, and a CPU (Central Processing Unit) 11.

The key input unit 14 includes the above input key group 2, and outputs to the CPU 11 an operation signal corresponding to a pushed key.

The display unit 15 includes the above display 3, and displays various pieces of information on the display 3 according to a display signal from the CPU 11. Further, the display unit 15 includes the touch panel 30 provided integrally with the display 3, and outputs the information about a position at which an input pen touches on the display screen, to the CPU 11.

The interface 16 is a connection terminal for connecting to an external device that is not illustrated, and can read data from the external device through a USB cable or the like in the present embodiment. In addition, this interface 16 may read data from a recording medium such as a card medium.

The RAM 12 is a volatile memory for storing information temporarily, and includes a plurality of work areas to store, for example, various programs to be executed and data related to these various programs. For example, the RAM 12 according to the present embodiment includes a mathematical formula storage area 120 as the work area.

The mathematical formula storage area 120 stores a graph formula to be input in graph function processing (see FIG. 3) described below.

The storing unit 13 is a nonvolatile memory which is composed of, for example, a ROM (Read Only Memory), and stores various programs and various pieces of data. More specifically, the storing unit 13 stores a graph function program 130 as the program according to the present invention and an image file group 131.

The graph function program 130 is a program for causing the CPU 11 to execute the graph function processing (see FIG. 3) described below.

The image file group 131 stores a plurality of image files 132 of images which can be displayed with the images overlaid on the coordinate system. Each of the image files 132 is formed by adding additional data to image data. The additional data shows a display range to be displayed (numerical value widths of X and Y axes) in the coordinate system to be displayed with the coordinate system being overlaid on the image, and scale intervals on each coordinate axis.

The CPU 11 centrally controls each unit of the scientific electronic calculator 1. More specifically, the CPU 11 expands a program specified among system programs and various application programs stored in the storing unit 13, in the RAM 12, and executes various pieces of processing in collaboration with the program expanded in the RAM 12.

1.3 Operation of Scientific Electronic Calculator

Next, the operation of the scientific electronic calculator 1 will be described.

Figure 3:
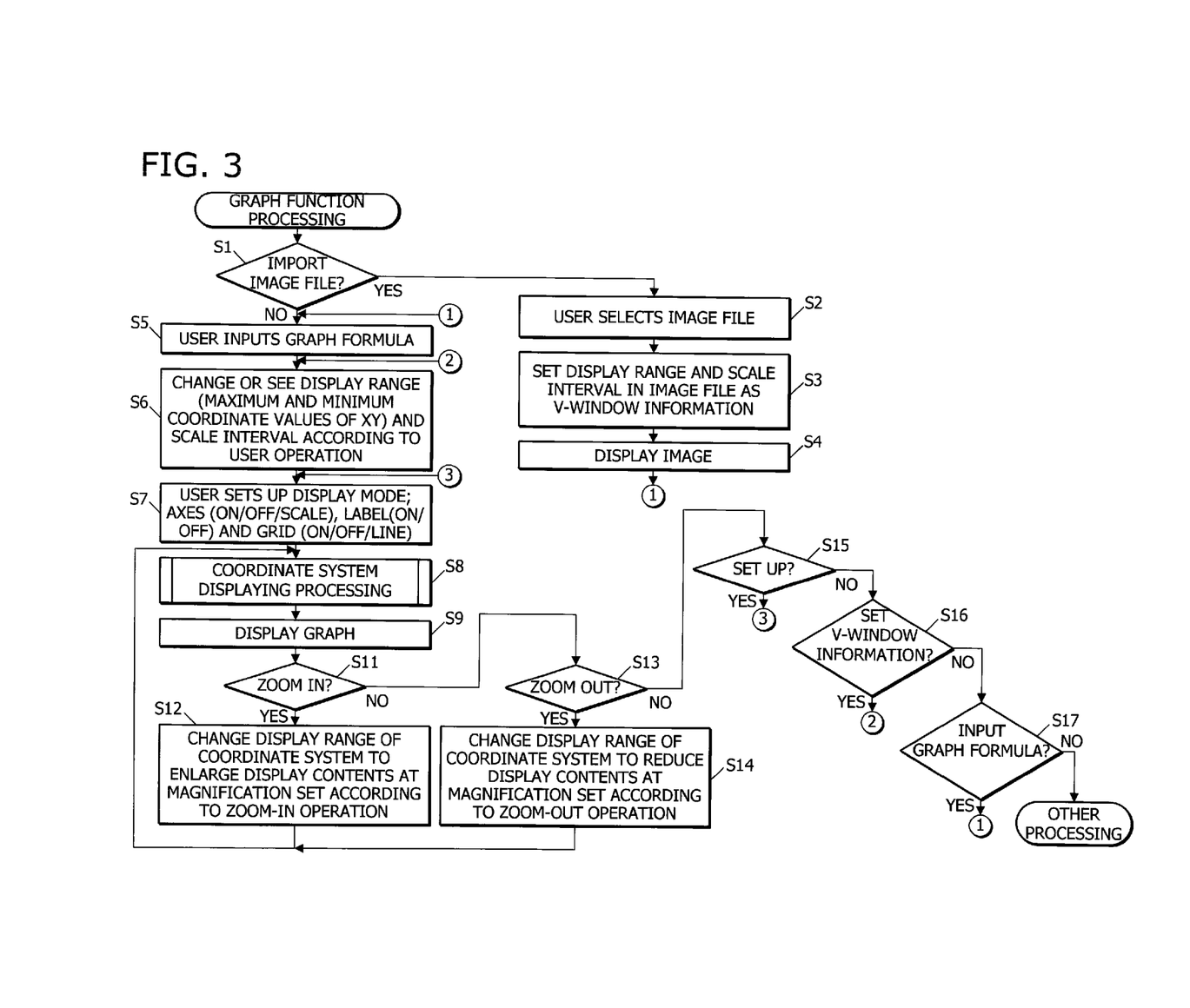
FIG. 3 is a flowchart illustrating a flow of graph function processing.

FIG. 3 is a flowchart illustrating the operation of the graph function processing. In addition, when a user inputs an execution command to perform the graph function processing through the touch panel 30 or the key input unit 14, the graph function program 130 is read from the storing unit 13 and adequately expanded in the RAM 12, and, as a result, the graph function processing is executed with the graph function program 130 and the CPU 11 collaborating with each other.

As illustrated in FIG. 3, in the graph function processing, the CPU 11 first determines whether a user operation of importing the image files 132 into the display screen of the display 3 is performed (Step S1). When determining that the user operation is performed (Step S1; Yes), the CPU 11 allows the user to select one of the image files 132 in the image file group 131 (Step S2).

Next, the CPU 11 sets additional data (a display range (maximum and minimum coordinate values of X and Y; Xmin, Xmax, Ymin, and Ymax) of the X-Y coordinate system and scale intervals (Xscl and Yscl)) which is added to the selected image file 132, as view window information (Step S3). After making the display 3 display the image of the selected image file 132 as a background of the coordinate system (Step S4), the CPU 11 moves on to Step S5 described below.

Further, when determining that the user operation of importing the image files 132 into the display screen is not performed in above Step S1 (Step S1; No), the CPU 11 allows the user to input a graph formula (Step S5). In addition, the graph formula may be input through the input key group 2, or may be input through the touch panel 30.

Next, when the user changes or sees the display range (maximum and minimum coordinate values of X and Y;

Xmin, Xmax, Ymin, and Ymax) of the X-Y coordinate system and the scale intervals (Xscl and Yscl) in the view window information, the CPU 11 sets such contents as the view window information (Step S6) and allows the user to set up a display mode of the X-Y coordinate system (Step S7). When the additional data in the selected image file 132 is set as the view window information in above Step S3, the CPU 11 makes the display 3 display the contents of the view window information and allows the user to see the contents in Step S6. Further, in Step S7, the user can configure the following setting; as a setting for "Axes" (X and Y axes), selecting either "on" (to display the coordinate axes), "off" (to hide the coordinate axes) or "scale" (to display the coordinate axes with scale values in scale positions); as a setting for "Label" (the names of the coordinate axes of X and Y and the origin position "0"), selecting either "on" (to display) or "off" (to hide); as a setting for "Grid", selecting either "on" (to display grid points), "off" (to hide a grid) or "line" (to display grid lines), and the like.

Figure 4:
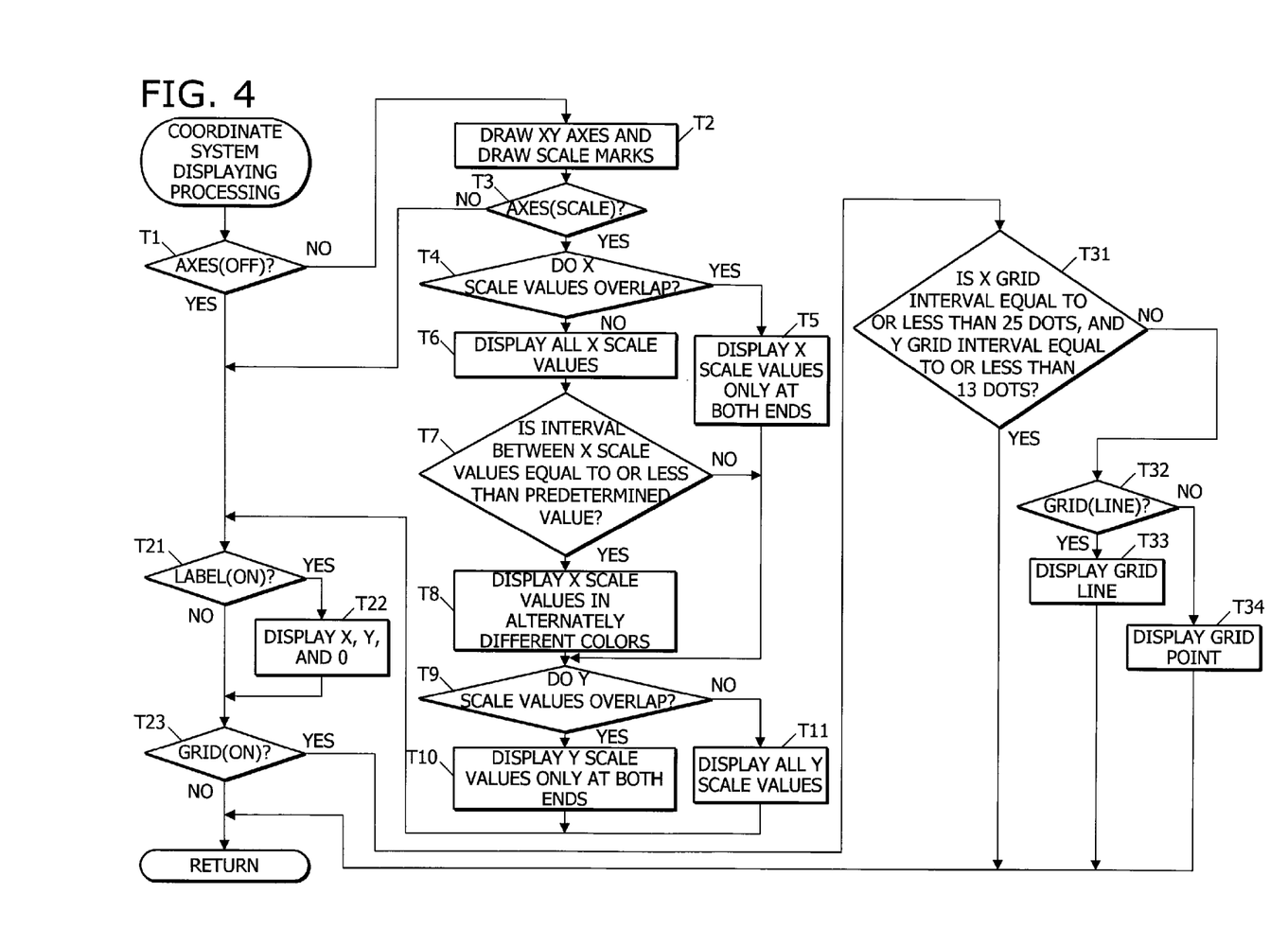
FIG. 4 is a flowchart illustrating a flow of coordinate system displaying processing.

Next, the CPU 11 performs coordinate system displaying processing (Step S8). More specifically, as illustrated in FIG. 4, the CPU 11 first determines whether a setting for "Axes" (X and Y axes) is set to "off" (Step T1) in this coordinate system displaying processing. When determining that the setting for "Axes" is set to "off" (Step T1; Yes), the CPU 11 moves on to Step T21 described below.

Further, when determining that the setting for "Axes" (X and Y axes) is not set to "off", that is, when determining that the setting for "Axes" is set to either "on" or "scale", in Step T1 (Step T1; No), the CPU 11 commands the X and Y axes to be drawn in the display area of the display 3 at the set numerical value widths, and commands scale marks to be drawn on the coordinate axes at the set scale intervals (Step T2).

Next, the CPU 11 determines whether the setting for "Axes" (X and Y axes) is set to "scale" (Step T3). When determining that the setting for "Axes" is not set to "scale" (Step T3; No), the CPU 11 moves on to Step T21 described below.

Further, when determining that the setting for "Axes" (X and Y axes) is set to "scale" in Step T3 (Step T3; Yes), the CPU 11 determines whether the scale values mutually overlap when the scale values are displayed in each scale position on the X axis (Step T4). In addition, a font, a point or a display digit of scale values in addition to scale intervals are used for the determination in Step T4.

When determining that the scale values in each scale position on the X axis mutually overlap in Step T4 (Step T4; Yes), the CPU 11 makes the display 3 display only the scale values of the scales at both ends (maximum value and minimum value), among the scales to be displayed on the X axis (Step T5), and then, moves on to Step T9 described below. In addition, in the present embodiment, the CPU 11 makes the display 3 display only the scale values of the scales at both ends among the scale values to be displayed on the X axis which can be displayed in the display area of the display 3 in Step T5. More specifically, as illustrated in FIG. 5D described below, when the X-axis scale interval is "50" and the range of "−450 to 450" is displayed in the display area of the display 3, the scale values "−450" and "450" at both ends of the X axis cannot be displayed in the display area, and therefore the scale values "−400" and "400" at both ends which can be displayed are displayed. In addition, the CPU 11 may always make the display 3 display the scale values of the scales at both ends in the display area in Step T5.

Further, when determining that the scale values in each of the scale positions on the X axis do not mutually overlap in Step T4 (Step T4; No), the CPU 11 makes the display 3 display the scale values in each of the scale positions on the X axis (Step T6). In addition, although the CPU 11 makes the display 3 display only the scale values which can be displayed in the display area of the display 3 among the scale values to be displayed in each of the scale positions on the X axis in Step T6 in the present embodiment, the CPU 11 may always make the display 3 display the scale values of all the scales.

Next, the CPU 11 determines whether the interval between the scale values in each of the scale positions on the X axis is equal to or less than a predetermined value (for example, equal to or less than a dot pitch) (Step T7). When determining that the interval is not equal to or less than the predetermined value (Step T7; No), the CPU 11 moves on to Step T9 described below.

Further, when determining that the interval between the scale values is equal to or less than the predetermined value in Step T7 (Step T7; Yes), the CPU 11 makes the display 3 display the scale values in the scale positions with the scale values displayed in alternately different colors. (Step T8). Accordingly, even when the interval between the scale values is small and the scale values look too close to each other, each scale value can be made identifiable. In addition, the predetermined value is not limited to a dot pitch but may be a value computed based on scale intervals, or a font, a point or a display digit of scale values in the determination in Step T7 described above.

Next, the CPU 11 determines whether the scale values mutually overlap when the scale values are displayed in each of the scale positions of the Y axis (Step T9).

When determining that the scale values in each of the scale positions on the Y axis mutually overlap in Step T9 (Step T9; Yes), the CPU 11 makes the display 3 display only the scale values of the scales at both ends (maximum value and minimum value) among the scales to be displayed on the Y axis (Step T10), and then, moves on to Step T21 described below. In addition, in the present embodiment, the CPU 11 makes the display 3 display only the scale values of the scales at both ends among the scale values to be displayed on the Y axis which can be displayed in the display area of the display 3 in Step T10. However, the CPU 11 may always make the display 3 display the scale values of the scales at both ends in the display area.

Further, when determining that the scale values in each of the scale positions on the Y axis do not mutually overlap in Step T9 (Step T9; No), the CPU 11 makes the display 3 display the scale values in each of the scale positions on the Y axis (Step T11). In addition, although the CPU 11 makes the display 3 display only the scale values which can be displayed in the display area of the display 3 among the scale values to be displayed in each of the scale positions on the Y axis in Step T11 in the present embodiment, the CPU 11 may always make the display 3 display the scale values of all the scales.

Next, the CPU 11 determines whether a setting for "Label" is set to "on" (Step T21). When determining that the setting for "Label" is not set to "on" (Step T21; No), the CPU 11 moves on to Step T23 described below.

Further, when determining that the setting for "Label" is set to "on" in Step T21 (Step T21; Yes), the CPU 11 makes the display 3 display the names of the coordinate axes of X and Y and the origin position "0" in the coordinate system of the display 3 (Step T22).

Next, the CPU 11 determines whether a setting for "Grid" is set to "on" (Step T23). When determining that the setting for "Grid" is not set to "on" (Step T23; No), the CPU 11 finishes the coordinate system displaying processing.

Further, when determining that the setting for "Grid" is set to "on" in Step T23 (Step T23; Yes), the CPU 11 determines whether the intervals of the grid to be displayed are equal to or less than a predetermined value (Step T31). In the present embodiment, the CPU 11 determines whether the grid interval is equal to or less than 25 dots in the X-axis direction, and is equal to or less than 13 dots in the Y-axis direction in Step T31. When this condition is satisfied, the grid intervals are too small, and display contents are too cramped.

When determining that the grid intervals are equal to or less than the predetermine values in Step T31 (Step T31; Yes), the CPU 11 finishes the coordinate system displaying processing without commanding a grid to be displayed.

Further, when determining that the grid intervals are not equal to less than the predetermined values in Step T31 (Step T31; No), the CPU 11 determines whether the setting for "Grid" is set to "line" (Step T32).

When determining that the setting for "Grid" is set to "line" in Step T32 (Step T32; Yes), the CPU 11 makes the display 3 display grid lines (Step T33), and then, finishes the coordinate system displaying processing.

Further, when determining that the setting for "Grid" is not set to "line" in Step T32 (Step T32; No), the CPU 11 makes the display 3 display grid points (Step T34), and then, finishes the coordinate system displaying processing.

When the above coordinate system displaying processing is finished, the CPU 11 makes the display 3 display the graph of the graph formula input in above Step S5 in the X-Y coordinate system (Step S9), and then, determines whether a zoom-in operation is performed (Step S11), as illustrated in FIG. 3.

When determining that the zoom-in operation is performed in Step S11 (Step S11; Yes), the CPU 11 changes the display range (maximum and minimum coordinate values of X and Y; Xmin, Xmax, Ymin, and Ymax) of the X-Y coordinate system in the view window information to enlarge display contents at the magnification set according to the zoom-in operation (Step S12), and then, moves on to above Step S8.

Further, when determining that the zoom-in operation is not performed in Step S11 (Step S11; No), the CPU 11 determines whether a zoom-out operation is performed (Step S13).

When determining that the zoom-out operation is performed in Step S13 (Step S13; Yes), the CPU 11 changes the display range (maximum and minimum coordinate values of X and Y; Xmin, Xmax, Ymin, and Ymax) of the X-Y coordinate system in the view window information to reduce display contents at the magnification set according to the zoom-out operation (Step S14), and then, moves on to above Step S8.

Further, when determining that the zoom-out operation is not performed in Step S13 (Step S13; No), the CPU 11 determines whether a set-up operation is performed (Step S15).

When determining that the set-up operation is performed in Step S15 (Step S15; Yes), the CPU 11 moves on to above Step S7.

Further, when determining that the set-up operation is not performed in Step S15 (Step S15; No), the CPU 11 determines whether an operation of setting the view window information is performed (Step S16).

When determining that the operation of setting the view window information is performed in Step S16 (Step S16; Yes), the CPU 11 moves on to above Step S6.

Further, when determining that the operation of setting the view window information is not performed in Step S16 (Step S16; No), the CPU 11 determines whether an operation of inputting a graph formula is performed (Step S17). When determining that the operation of inputting a graph formula is not performed (Step S17; No), the CPU 11 moves on to another processing. On the other hand, when determining that the operation of inputting a graph formula is performed (Step S17; Yes), the CPU 11 moves on to above Step S5.

1.4 Operation Example

Next, the operation of the above scientific electronic calculator 1 will be described in detail with reference to the accompanying drawing.

Operation Example 1

Figure 5A:
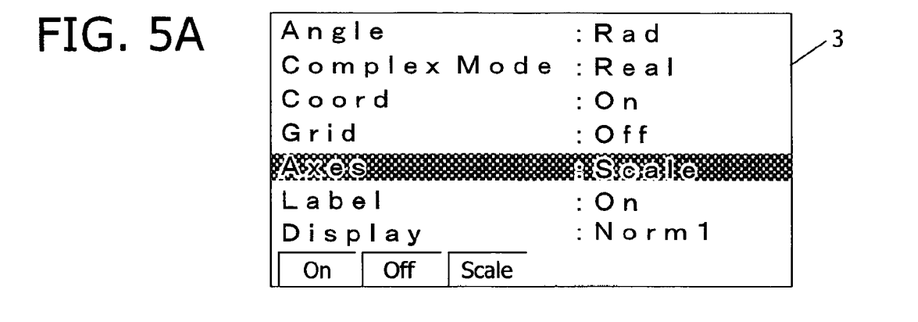
FIGS. 5A to 5D illustrate display contents on a display.

First, as illustrated in FIG. 5A, a user inputs the graph formula "Y=½X" (Step S5) without performing the operation of importing the image files 132 into the display screen (Step S1; No). Then, the user sets the view window information by setting the numerical value width to "−450 to 450" and the scale interval to "100" on the X axis and the numerical value width to "−500 to 500" and the scale interval to "100" on the Y axis (Step S6). After that, the user sets up the X-Y coordinate system by setting "Axes" to "scale", "Label" to "on" and "Grid" to "off" (Step S7).

Figure 5B:
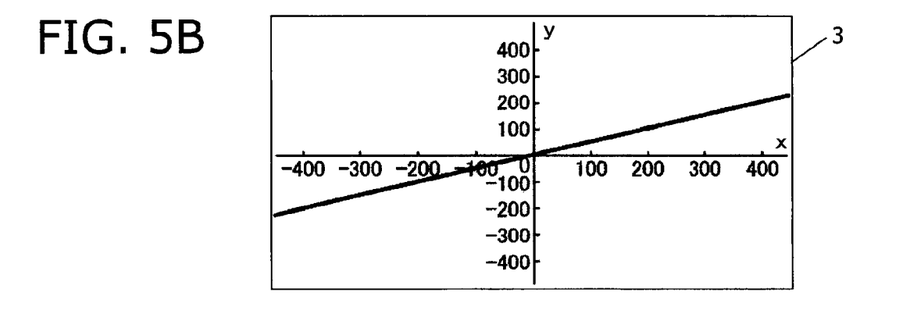

As a result, it is determined that the setting for "Axes" is not set to "off" (Step T1; No), and the X and Y axes are drawn in the display area of the display 3 according to the set numerical value widths "X axis: −450 to 450" and "Y axis: −500 to 500" and the scale marks are drawn on the coordinate axes at the set scale interval "X and Y axes: 100" (Step T2), as illustrated in FIG. 5B. Further, it is determined that the setting for "Axes" is set to "scale" (Step T3; Yes) and it is determined that, when the scale values are displayed in each of the scale positions on the X axis, the scale values do not mutually overlap (Step T4; No), and the scale values are displayed in each of the scale positions on the X axis (Step T6). Further, it is determined that the interval between the scale values in the scale positions on the X axis is not equal to or less than a predetermined value (Step T7; No) and it is determined that, when the scale values are displayed in each of the scale positions on the Y axis, the scale values do not mutually overlap (Step T9; No), and the scale values are displayed in each of the scale positions on the Y axis (Step T11). Then, it is determined that the setting for "Label" is set to "on" (Step T21; Yes), and the names of the coordinate axes of X and Y and the origin position "0" are displayed in the coordinate system (Step T22). Then, the graph of the graph formula "Y=½X" is displayed in the X-Y coordinate system (Step S9).

Figure 5C:
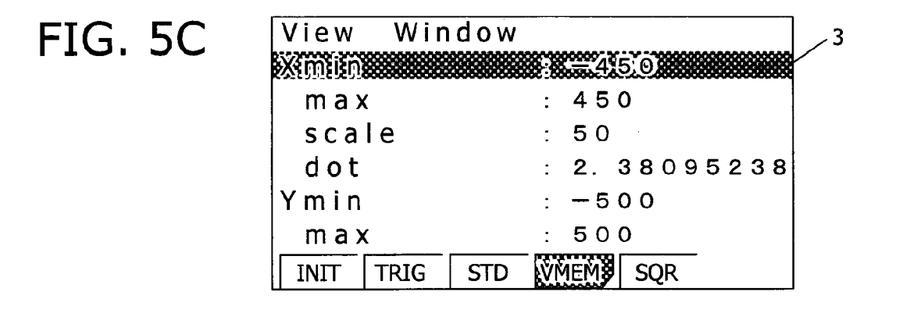
Figure 5D:
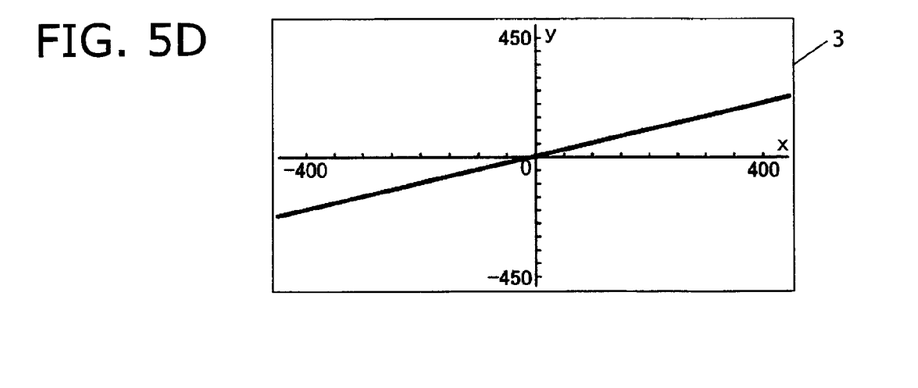

Next, after performing the operation of setting the view window information (Step S16; Yes), the user sets again the view window information by setting the numerical value width to "−450 to 450" and the scale interval to "50" on the X coordinate and the numerical value width to "−500 to 500" and the scale interval to "50" on the Y coordinate (Step S6), as illustrated in FIG. 5C, and sets up the X-Y coordinate system in a similar way to the above (Step S7). Then, as illustrated in FIG. 5D, it is determined that the setting for "Axes" is not set to "off" (Step T1; No), and the X and Y axes are drawn in the display area of the display 3 according to the set numerical value widths "X axis: −450 to 450" and "Y axis: −500 to 500" and the scale marks are drawn on the coordinate axes at the set scale interval "X and Y axes: 50" (Step T2). Further, it is determined that the setting for "Axes" is set to "scale" (Step T3; Yes) and it is determined that, when the scale values are displayed in each of the scale positions on the X axis, the scale values mutually overlap (Step T4; Yes), and only the scale values of the scale values at both ends (maximum value "400" and minimum value "−400"), among the scales to be displayed on the X axis which can be displayed in the display area, are displayed (Step T5). Further, it is determined that, when the scale values are displayed in each of the scale positions on the Y axis, the scale values mutually overlap (Step T9; Yes), and only the scale values of the scale values at both ends (maximum value "450" and minimum value "−450"), among the scales to be displayed on the Y axis which can be displayed in the display area, are displayed (Step T10). Then, it is determined that the setting for "Label" is set to "on" (Step T21; Yes), and the names of the coordinate axes of X and Y and the origin position "0" are displayed in the coordinate system (Step T22). Then, the graph of the graph formula "Y=½X" is displayed on the X-Y coordinate system (Step S9).

Figure 6A:
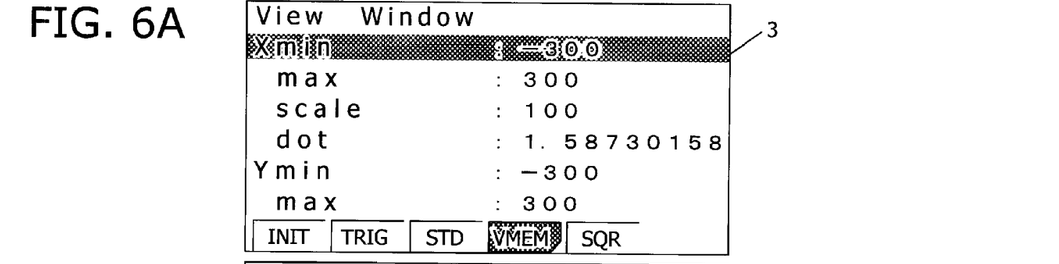
FIGS. 6A to 6E illustrate display contents on the display.
Figure 6B:
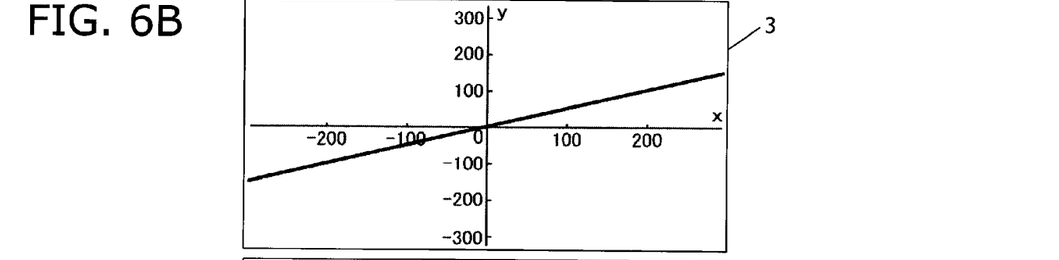

Further, when the user sets again the view window information, from the state where the contents of above FIG. 5B are displayed, by setting the numerical value width to "−300 to 300" and the scale interval to "100" on the X coordinate and the numerical value width to "−300 to 300" and the scale interval to "100" on the Y coordinate (Step S6) as illustrated in FIG. 6A, and sets up the X-Y coordinate system in a similar way to the above (Step S7), it is determined that the setting for "Axes" is not set to "off" (Step T1; No), and the X and Y axes are drawn in the display area of the display 3 according to the set numerical value widths "X and Y axes: −300 to 300" and the scale marks are drawn on the coordinate axes at the set scale intervals "X and Y axes: 100" (Step T2), as illustrated in FIG. 6B. Further, it is determined that the setting for "Axes" is set to "scale" (Step T3; Yes) and it is determined that, when the scale values are displayed in each of the scale positions on the X axis, the scale values do not mutually overlap (Step T4; No), and the scale values are displayed in each of the scale positions on the X axis (Step T6). Further, it is determined that the interval between scale values in scale positions on the X axis is not equal to or less than the predetermined value (Step T7; No) and it is determined that, when the scale values are displayed in each of the scale positions on the Y axis, the scale values do not mutually overlap (Step T9; No), and the scale values are displayed in each of the scale positions on the Y axis (Step T11). Then, it is determined that the setting for "Label" is set to "on" (Step T21; Yes), and the names of the coordinate axes of X and Y and the origin position "0" are displayed in the coordinate system (Step T22). Then, the graph of the graph formula "Y=½X" is displayed in the X-Y coordinate system (Step S9).

Figure 6C:
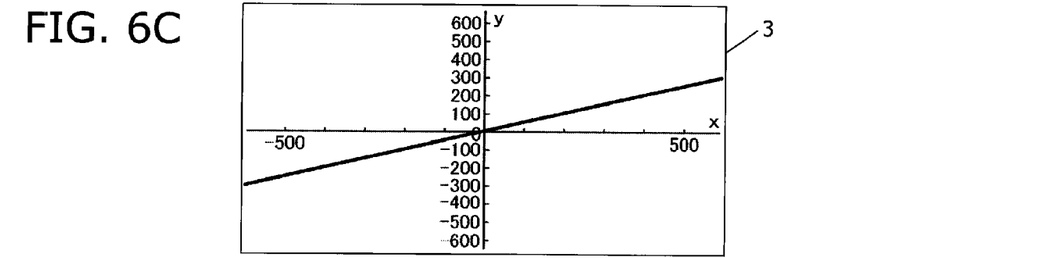
Figure 6D:
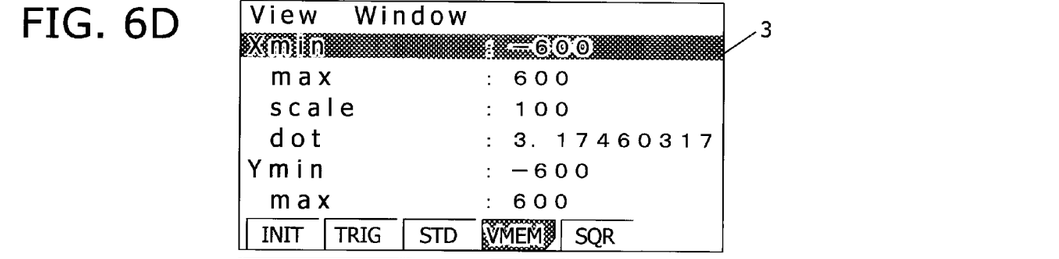

Next, when the user performs the zoom-out operation (Step S13; Yes), the display range (maximum and minimum coordinate values of X and Y; Xmin, Xmax, Ymin, and Ymax) of the X-Y coordinate system in the view window information is changed to reduce display contents at the magnification (in this embodiment, ½-fold magnification) set according to the zoom-out operation (Step S14), it is determined that the setting for "Axes" is not set to "off" (Step T1; No), and the X and Y axes are drawn in the display area of the display 3 according to the numerical value widths "X and Y axes: −600 to 600" set by the zoom-out operation and the scale marks are drawn on the coordinate axes at the set scale interval "X and Y axes: 100" (Step T2), as illustrated in FIG. 6C. Further, it is determined that the setting for "Axes" is set to "scale" (Step T3; Yes) and it is determined that, when the scale values are displayed in each of the scale positions on the X axis, the scale values mutually overlap (Step T4; Yes), and only the scale values of the scales at both ends (maximum value "500" and minimum value "−500"), among the scales to be displayed on the X axis which can be displayed in the display area, are displayed (Step T5). Further, it is determined that, when the scale values are displayed in each of the scale positions on the Y axis, the scale values do not mutually overlap (Step T9; No), and the scale values are displayed in each of the scale positions on the Y axis (Step T11). Then, it is determined that the setting for "Label" is set to "on" (Step T21; Yes), and the names of the coordinate axes of X and Y and the origin position "0" are displayed in the coordinate system (Step T22). Then, the graph of the graph formula "Y=½X" is displayed in the X-Y coordinate system (Step S9). In addition, the view window information at this time is as illustrated in FIG. 6D.

Figure 6E:
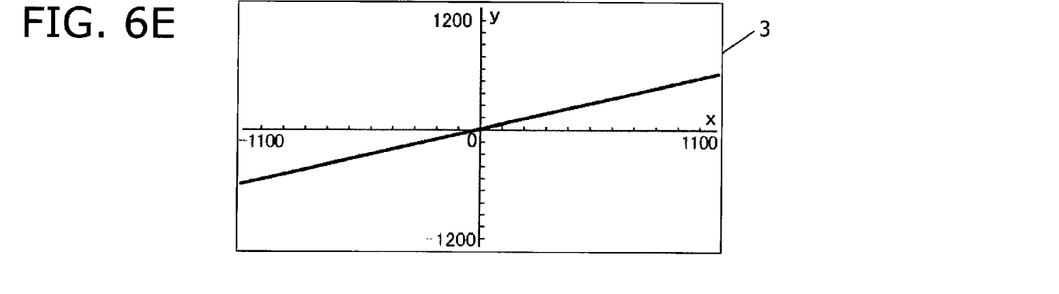

Next, in a similar way to the above, when the user performs the zoom-out operation (Step S13; Yes), the display range (maximum and minimum coordinate values of X and Y; Xmin, Xmax, Ymin, and Ymax) of the X-Y coordinate system in the view window information is changed to reduce display contents at the magnification (in this embodiment, ½-fold magnification) set according to the zoom-operation (Step S14). Then, it is determined that the setting for "Axes" is not set to "off" (Step T1; No), and the X and Y axes are drawn in the display area of the display 3 according to the numerical value widths "X and Y axes: −1200 to 1200" set by the zoom-out operation and the scale marks are drawn on the coordinate axes at the set scale interval "X and Y axes: 100" (Step T2), as illustrated in FIG. 6E. Further, it is determined that the setting for "Axes" is set to "scale" (Step T3; Yes) and it is determined that, when the scale values are displayed in each of the scale positions on the X axis, the scale values mutually overlap (Step T4; Yes), and only the scale values of the scales at both ends (maximum value "1100" and minimum value "−1100"), among the scales to be displayed on the X axis which can be displayed in the display area, are displayed (Step T5). Further, it is determined that, when the scale values are displayed in each of the scale positions on the Y axis, the scale values mutually overlap (Step T9; Yes), and only the scale values of the scales at both ends (maximum value "1200" and minimum value "−1200"), among the scales to be displayed on the Y axis which can be displayed in the display area, are displayed (Step T10). Then, it is determined that the setting for "Label" is set to "on" (Step T21; Yes), and the names of the coordinate axes of X and Y and the origin position "0" are displayed in the coordinate system (Step T22). Then, the graph of the graph formula "Y=½X" is displayed in the X-Y coordinate system (Step S9).

Operation Example 2

Figure 7A:
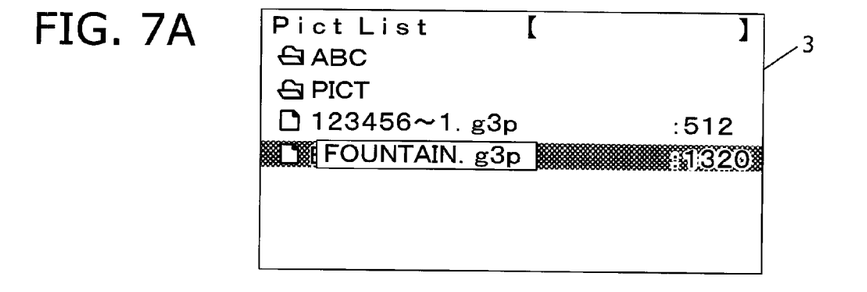
FIGS. 7A to 7D illustrate display contents on the display.

First, as illustrated in FIG. 7A, the user performs the operation of importing the image files 132 into the display screen of the display 3 (Step S1; Yes), and selects one of the image files 132 named "FOUNTAIN.g3p" in the image file group 131 (Step S2).

Figure 7B:
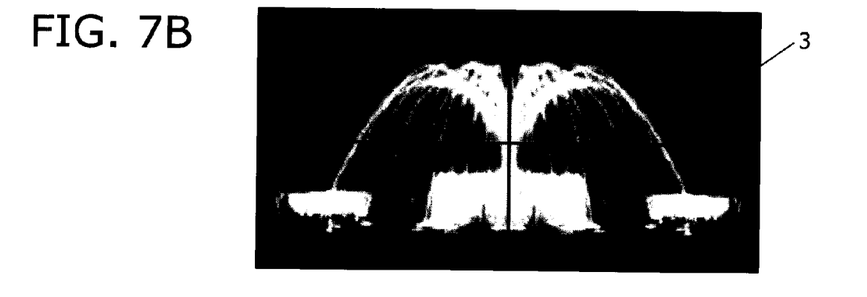
Figure 7C:
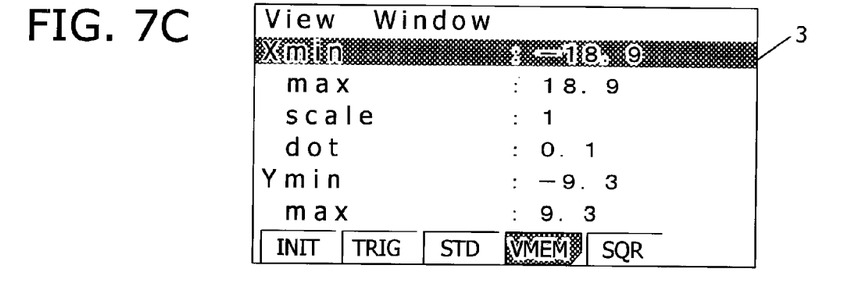

Next, as illustrated in FIG. 7B, the additional data (numerical value widths and scale intervals of X and Y axes) added to the selected image file 132 is set as the view window information (Step S3), and the image of the selected image file 132 (in this embodiment, the image of a fountain shot from the side) is displayed on the display 3 as a background of the coordinate system (Step S4). In addition, in the additional data in this image file 132, the numerical value width is "−18.9 to 18.9" and the scale interval is "1" on the X coordinate, and the numerical value width is "−9.3 to 9.3" and the scale interval is "1" on the Y coordinate, as illustrated in FIG. 7C.

Figure 7D:
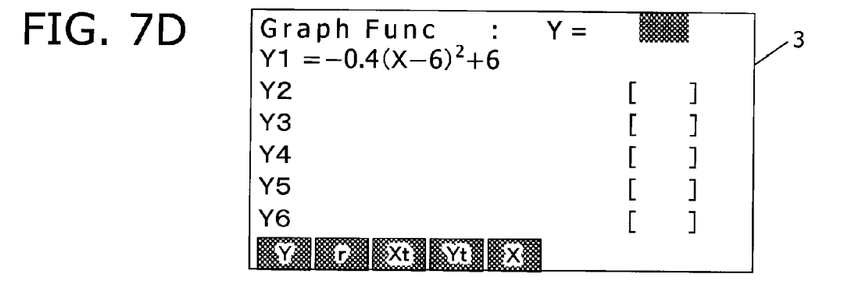
Figure 8A:
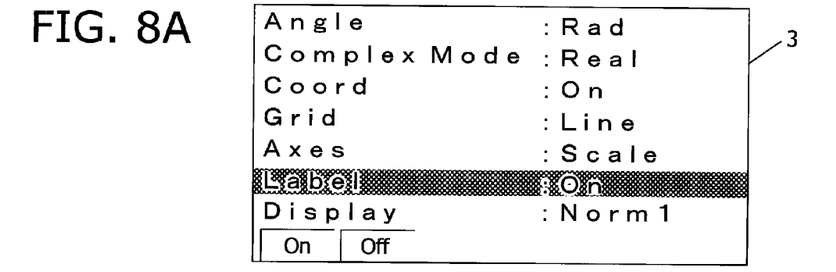
FIGS. 8A to 8C illustrate display contents on the display.

Next, as illustrated in FIG. 7D and FIG. 8A, a user inputs the graph formula "Y=−0.4(X−6)2+6" (Step S5), and sets up the X-Y coordinate system by setting "Axes" to "scale", "Label" to "on" and "Grid" to "line" (Step S7).

Figure 8B:
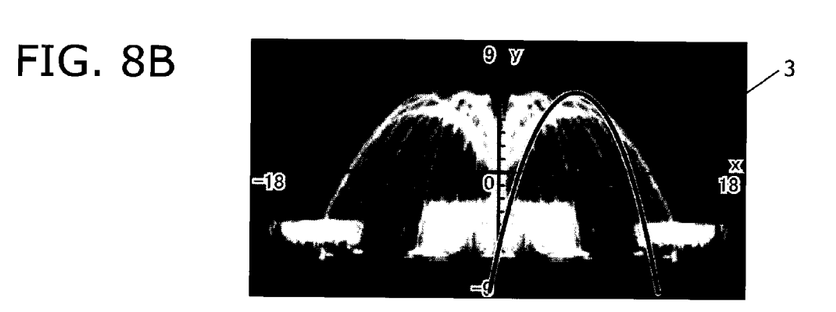

As a result, it is determined that the setting for "Axes" is not set to "off" (Step T1; No), and the X and Y axes are drawn in the display area of the display 3 according to the set numerical value widths "X axis: −18.9 to 18.9" and "Y axis: −9.3 to 9.3" and the scale marks are drawn on the coordinate axes at the set scale intervals "X and Y axes: 1" (Step T2), as illustrated in FIG. 8B. Further, it is determined that the setting for "Axes" is set to "scale" (Step T3; Yes) and it is determined that, when the scale values are displayed in each of the scale positions on the X axis, the scale values mutually overlap (Step T4; Yes), and only the scale values of the scales at both ends (maximum value "18" and minimum value "−18"), among the scales to be displayed on the X axis which can be displayed in the display area, are displayed (Step T5). Further, it is determined that, when the scale values are displayed in each of the scale positions on the Y axis, the scale values mutually overlap (Step T9; Yes), and only the scale values of the scales at both ends (maximum value "9" and minimum value "−9"), among the scales to be displayed on the Y axis which can be displayed in the display area, are displayed (Step T10). Then, it is determined that the setting for "Label" is set to "on" (Step T21; Yes) and the names of the coordinate axes of X and Y and the origin position "0" are displayed in the coordinate system (Step T22). Then, it is determined that the setting for "Grid" is set to "on" (Step T23; Yes) and it is determined that the interval of the grid to be displayed is equal to or less than a predetermined value (the grid interval is equal to or less than 25 dots in the X-axis direction and is equal to or less than 13 dots in the Y-axis direction) (Step T31; Yes). Then, the graph of the graph formula "Y=−0.4 (X−6)2+6" is displayed in the X-Y coordinate system without the grid being displayed (Step S9).

Figure 8C:
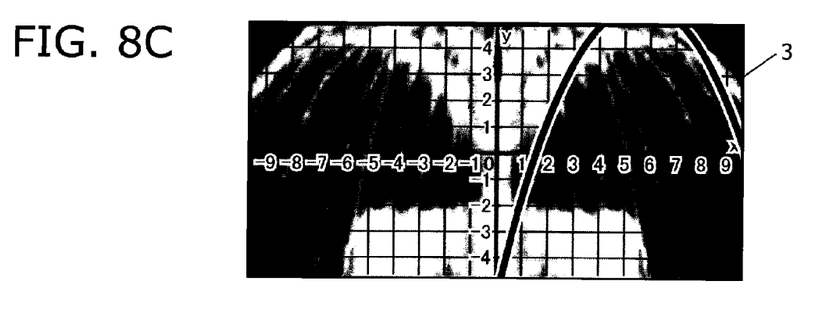

Next, when the user performs the zoom-in operation (Step S11; Yes), the display range (maximum and minimum coordinate values of X and Y; Xmin, Xmax, Ymin, and Ymax) of the X-Y coordinate system in view window information is changed to enlarge display contents at the magnification (in this embodiment 2-fold magnifications) set according to the zoom-in operation (Step S12). Then, it is determined that the setting for "Axes" is not set to "off" (Step T1; No), and the X and Y axes are drawn in the display area of the display 3 according to the numerical value widths "X axis: −9.45 to 9.45" and "Y axis: −4.65 to 4.65" set by the zoom-in operation and the scale marks are drawn on the coordinate axes at the set scale intervals "X and Y axes: 1" (Step T2), as illustrated in FIG. 8C. Further, it is determined that the setting for "Axes" is set to "scale" (Step T3; Yes) and it is determined that, when the scale values are displayed in each of the scale positions on the X axis, the scale values do not mutually overlap (Step T4; No), and the scale values are displayed in each of the scale positions on the X axis (Step T6). Further, it is determined that the interval between the scale values in the scale positions on the X axis is not equal to or less than the predetermined value (Step T7; No) and it is determined that, when the scale values are displayed in each of the scale positions on the Y axis, the scale values do not mutually overlap (Step T9; No), and the scale values are displayed in each of the scale positions on the Y axis (Step T11). Then, it is determined that the setting for "Label" is set to "on" (Step T21; Yes) and the names of the coordinate axes of X and Y and the origin position "0" are displayed in the coordinate system (Step T22). Then, it is determined that the setting for "Grid" is set to "on" (Step T23; Yes), the grid interval is not equal to or less than a predetermined value (Step T31; No) and that the setting for "Grid" is set to "line" (Step T32; Yes), and the grid lines are displayed (Step T33). Then, the graph of the graph formula "Y=−0.4(X−6)2+6" is displayed in the X-Y coordinate system (Step S9).

Operation Example 3

Figure 9A:
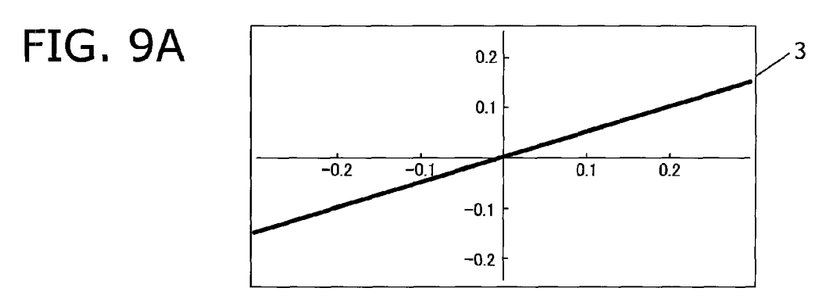
FIGS. 9A to 9C illustrate display contents on the display.

First, the user inputs the graph formula "Y=½X" (Step S5), without performing the operation of importing the image file 132 into the display screen (step S1; No), sets view window information by setting the numerical the value width to "−0/3 to 0.3" and the scale value to "0.1" on the X coordinate and the numerical value to "−0.2 to 0.2" and the scale interval to "0.1" on the Y coordinate (Step S6), and then, sets up the X-Y coordinate system by setting "Axes" to "scale", "Label" to "off" and "Grid" to "off" (Step S7). Then, it is determined that the setting for "Axes" is not set to "off" (Step T1; No), and the X and Y axes are drawn in the display area of the display 3 according to the set numerical value widths "X axis: −0.3 to 0.3" and "Y axis: −0.2 to 0.2" and the scale marks are drawn on the coordinate axes at the set scale intervals "X and Y axes: 0.1" (Step T2), as illustrated in FIG. 9A. Further, it is determined that the setting for "Axes" is set to "scale" (Step T3; Yes) and it is determined that, when the scale values are displayed in each of the scale positions on the X axis, the scale values do not mutually overlap (Step T4; No), and the scale values are displayed in each of the scale positions on the X axis (Step T6). Furthermore, it is determined that the interval between the scale values in the scale positions on the X axis is not equal to or less than the predetermined value (Step T7; No) and it is determined that, when the scale values are displayed in each of the scale positions on the Y axis, the scale values do not mutually overlap (Step T9; No), and the scale values are displayed in each of the scale positions on the Y axis (Step T11). Then, the graph of the graph formula "Y=½X" is displayed in the X-Y coordinate system (Step S9).

Figure 9B:
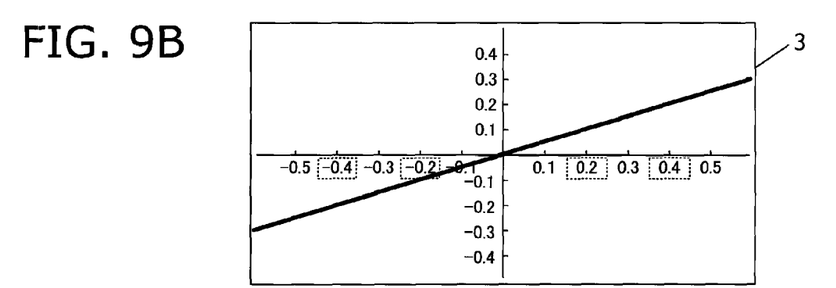

Next, when the user performs the zoom-out operation (Step S13; Yes), the display range (maximum and minimum coordinate values of X and Y; Xmin, Xmax, Ymin, and Ymax) of the X-Y coordinate system in view window information is changed to reduce display contents at the magnification (in this embodiment, ½-fold magnification) set according to the zoom-out operation (Step S14). Then, it is determined that the setting for "Axes" is not set to "off" (Step T1; No), and the X and Y axes are drawn in the display area of the display 3 according to the numerical value widths "X axis: −0.6 to 0.6" and "Y axis: −0.4 to 0.4" set by the zoom-out operation and the scale marks are drawn on the coordinate axes at the set scale interval "X and Y axes: 0.1" (Step T2), as illustrated in FIG. 9B. Further, it is determined that the setting for "Axes" is set to "scale" (Step T3; Yes) and it is determined that, when the scale values are displayed in each of the scale positions on the X axis, the scale values do not mutually overlap (Step T4; No), and the scale values are displayed in each of the scale positions on the X axis (Step T6). Furthermore, it is determined that the interval between the scale values in the scale positions on the X axis is equal to or less than a predetermined value (in this embodiment, equal to or less than a dot pitch) (Step T7; Yes), and the scale values in the scale positions are displayed in alternately different display colors (Step T8). In addition, in FIG. 9B, the areas enclosed by broken lines in the display screen of the display 3 show that the texts in the areas are displayed in blue color.

Then, it is determined that, when the scale values are displayed in each of the scale positions on the Y axis, the scale values do not mutually overlap (Step T9; No), and the scale values are displayed in each of the scale positions on the Y axis (Step T11). Then, the graph of the graph formula "Y=½X" is displayed in the X-Y coordinate system (Step S9).

As described above, according to the present embodiment, as illustrated in, for example, Step S6 of FIG. 3, Steps T4 to T11 of FIG. 4, and FIGS. 5A to 9C, a display range to be displayed of the coordinate system and scale intervals on the coordinate axes in the coordinate system are set based on the user operation, and overlapping of the scale values to be displayed on the coordinate axes is detected. When the scale values overlap, only the scale values of scales at both ends among the scales to be displayed on the coordinate axes are displayed. Therefore, it is possible to display the range to be displayed of the graph while preventing the graph from looking cramped, and preventing the scale intervals from being changed.

Further, as illustrated in, for example, Steps S8 and S11 to S14 in FIG. 3 and FIGS. 6A to 6E, when display contents are subjected to either zooming-in or zooming-out, overlapping of scale values to be displayed on the coordinate axes is detected. Therefore, even when the scale values overlap due to the zooming-in or zooming-out operation, it is possible to display a range to be displayed of the graph while preventing the graph from looking cramped, and preventing the scale intervals from being changed.

In addition, the detailed configuration and detailed operation of each component of the scientific electronic calculator 1 according to the above embodiment can be naturally changed adequately within the range which does not deviate from the gist of the present invention.

For example, although the graph display apparatus according to the present invention has been described as the scientific electronic calculator 1, the apparatus to which the present invention is applicable is by no means limited to such a product but the present invention is generally applicable to the electronic devices such as mobile telephones, personal computers, PDAs (Personal Digital Assistant), and game machines. Further, the graph function program 130 according to the present invention may be stored in, for example, a memory card or a CD which is removable from the scientific electronic calculator 1.

Further, although the processing of Step S1 has been described on the assumption that the image files 132 in the storing unit 13 are imported into the display screen, the image file 132 may be imported into the display screen from an external device through the interface 16.

Figure 9C:
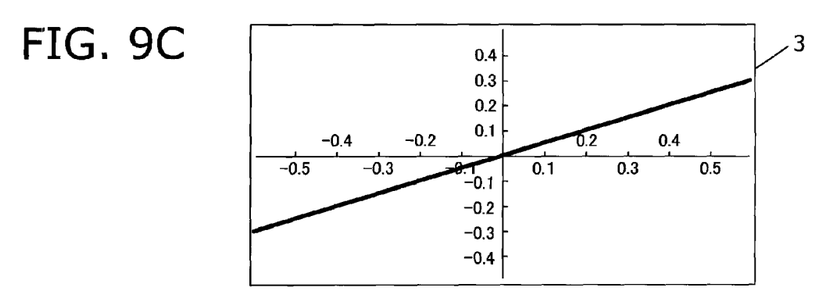

Furthermore, although the processing of Step T8 has been described on the assumption that, when the interval between scale values in scale positions on the X axis is equal to or less than a predetermined value (equal to or less than a dot pitch), the scale values in the scale positions are displayed in alternately different display colors, the same processing may be applied to scale values in scale positions on the Y axis. Still further, as illustrated in FIG. 9C, the scale values can also be displayed so that the scale values are disposed at both sides of the coordinate axes alternately, in the processing of Step T8.

Moreover, although the vertical axis and the horizontal axis of the coordinate system have been described as the Y axis and the X axis respectively, other names of the coordinate axes may be given. Further, although the coordinate system has been described as an orthogonal coordinate system, other types of coordinate systems such as an oblique coordinate system or polar coordinate system may be used.

Further, although the processing of Step S5 has been described on the assumption that the user inputs a graph formula through the input key group 2, the user may input a graph formula through the touch panel 30.

The entire disclosure of Japanese Patent Application No. 2010-063527 filed on Mar. 19, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A graph display apparatus comprising:
a display unit;
a graph formula input unit for receiving input of a graph formula based on a user operation;
a coordinate system setting unit for setting a display range of a coordinate system and a scale interval on a coordinate axis in the coordinate system based on the user operation;
a coordinate system display controlling unit for making the display unit display the coordinate axis in the coordinate system in the display range set by the coordinate system setting unit and display scales and scale values at the scale interval set by the coordinate system setting unit on the coordinate axis, the coordinate system display controlling unit including a scale value display controlling unit for detecting overlapping of the scale values to be displayed on the coordinate axis, and, when the scale values overlap, making the display unit display only scale values of scales at both ends among the scales to be displayed on the coordinate axis;
a graph display controlling unit for making the display unit display a graph of the graph formula in the set display range of the coordinate system;
an image data storing unit in which at least one piece of image data is stored;
an image data selecting unit for selecting any one piece of image data in the image data storing unit, as selected image data, based on the user operation; and
an image data display controlling unit for making the display unit display an image of the selected image data as a background of the coordinate system,
wherein additional data is added to the image data, the additional data showing the display range of the coordinate system to be displayed with the coordinate system overlaid on the image of the image data, and showing the scale interval on the coordinate axis,
wherein the coordinate system setting unit sets the display range of the coordinate system and the scale interval on the coordinate axis, according to the additional data added to the selected image data,
wherein the coordinate system setting unit includes a grid display setting unit for setting whether to display a grid line or grid point at positions corresponding to each position where the scales are displayed in the coordinate system,
wherein the coordinate system display controlling unit makes the display unit hide the grid line or grid point when the grid display setting unit performs setting for hiding the grid line or grid point, and
wherein the coordinate system display controlling unit makes the display unit display the grid line or grid point when the grid display setting unit performs setting for displaying the grid line or grid point and when, at the same time, an interval of the grid lines or grid points to be displayed at the positions corresponding to the positions where the scales are displayed is more than a predetermined value.

2. The graph display apparatus according to claim 1, wherein the coordinate system setting unit sets the scale interval for each of the coordinate axes in the coordinate system based on the user operation, the coordinate system display controlling unit makes the display unit display the scales and the scale values at the scale interval set by the coordinate system setting unit for each of the coordinate axes in the coordinate system, and the scale value display controlling unit detects the overlapping of the scale values to be displayed for each of the coordinate axes, and, when the scale values on any one of the coordinate axes overlap, makes the display unit display only the scale values of the scales at both ends among the scales to be displayed on the coordinate axis.

3. The graph display apparatus according to claim 1, further comprising a display range zooming in/out unit for changing the display range of the coordinate system set by the coordinate system setting unit according to one of a zooming-in operation and a zooming-out operation by the user, wherein the scale value display controlling unit detects the overlapping of the scale values to be displayed on the coordinate axis when the display range zooming in/out unit changes the display range of the coordinate system, the scale value display controlling unit makes the display unit display only the scale values of the scales at both ends among the scales to be displayed on the coordinate axis when the scale values overlap, and the scale value display controlling unit makes the display unit display the scale values of each of the scales to be displayed on the coordinate axis when the scale values do not overlap.

4. The graph display apparatus according to claim 1, wherein the coordinate system setting unit includes an axis name display setting unit for setting whether to display a coordinate axis name of the coordinate axis and an origin symbol indicating an origin position, based on the user operation, the coordinate system display controlling unit makes the display unit hide the coordinate axis name and the origin symbol when the axis name display setting unit performs a setting so that the coordinate axis name and the origin symbol are to be hidden, and the coordinate system display controlling unit makes the display unit display the coordinate axis name and the origin symbol when the axis name display setting unit performs a setting so that the coordinate axis name and the origin symbol are to be displayed.

5. A non-transitory recording medium having recorded therein a program that is executable by a computer having a display unit and an image data storing unit in which at least one piece of image data is stored, the program being executable by the computer to cause the computer to realize functions comprising:
  a graph formula input function for receiving input of a graph formula based on a user operation;
  a coordinate system setting function for setting a display range of a coordinate system and a scale interval on a coordinate axis in the coordinate system based on the user operation;
  a coordinate system display controlling function for making the display unit display the coordinate axis in the coordinate system in the display range set by the coordinate system setting function and display scales and scale values at the scale interval set by the coordinate system setting function on the coordinate axis, the coordinate system display controlling function including a scale value display controlling function for detecting overlapping of the scale values to be displayed on the coordinate axis, and, when the scale values overlap, making the display unit display only scale values of scales at both ends among the scales to be displayed on the coordinate axis;
  a graph display controlling function for making the display unit display a graph of the graph formula in the set display range of the coordinate system;
  an image data selecting function for selecting any one piece of image data in the image data storing unit, as selected image data, based on the user operation; and
  an image data display controlling function for making the display unit display an image of the selected image data as a background of the coordinate system,
  wherein additional data is added to the image data, the additional data showing the display range of the coordinate system to be displayed with the coordinate system overlaid on the image of the image data, and showing the scale interval on the coordinate axis,
  wherein the coordinate system setting function sets the display range of the coordinate system and the scale interval on the coordinate axis, according to the additional data added to the selected image data,
  wherein the coordinate system setting function includes a grid display setting function for setting whether to display a grid line or grid point at positions corresponding to each position where the scales are displayed in the coordinate system,
  wherein the coordinate system display controlling function makes the display unit hide the grid line or grid point when the grid display setting function performs setting for hiding the grid line or grid point, and
  wherein the coordinate system display controlling function makes the display unit display the grid line or grid point when the grid display setting function performs setting for displaying the grid line or grid point and when, at the same time, an interval of the grid lines or grid points to be displayed at the positions corresponding to the positions where the scales are displayed is more than a predetermined value.

6. A graph display method for a display apparatus including a display unit, an input unit, and an image data storing unit in which at least one piece of image data is stored, the graph display method comprising:
  (a) setting a display range of a coordinate system and a scale interval on a coordinate axis in the coordinate system based on a user operation on the input unit;
  (b) making the display unit display the coordinate axis in the coordinate system in the display range set by step (a) and display scales and scale values at the scale interval set by step (a) on the coordinate axis, step (b) including (b1) detecting overlapping of the scale values to be displayed on the coordinate axis, and, when the scale values overlap, making the display unit display only scale values of scales at both ends among the scales to be displayed on the coordinate axis;
  (c) making the display unit display a graph of a graph formula in the set display range of the coordinate system;
  (d) selecting any one piece of image data in the image data storing unit, as selected image data, based on the user operation; and
  (e) making the display unit display an image of the selected image data as a background of the coordinate system,
  wherein additional data is added to the image data, the additional data showing the display range of the coordinate system to be displayed with the coordinate system overlaid on the image of the image data, and showing the scale interval on the coordinate axis, wherein step (a) includes setting the display range of the coordinate system and the scale interval on the coordinate axis, according to the additional data added to the selected image data, wherein step (a) further includes (a1) setting whether to display a grid line or grid point at positions corresponding to each position where the scales are displayed in the coordinate system, wherein step (b) includes making the display unit hide the grid line or grid point when setting for hiding the grid line is performed in step (a1), and wherein step (b) includes making the display unit display the grid line or grid point when the setting for displaying the grid line or grid point is performed in step (a1) and when, at the same time, an interval of the grid lines or grid points to be displayed at the positions corresponding to the positions where the scales are displayed is more than a predetermined value.

* * * * *